UNITED STATES PATENT OFFICE.

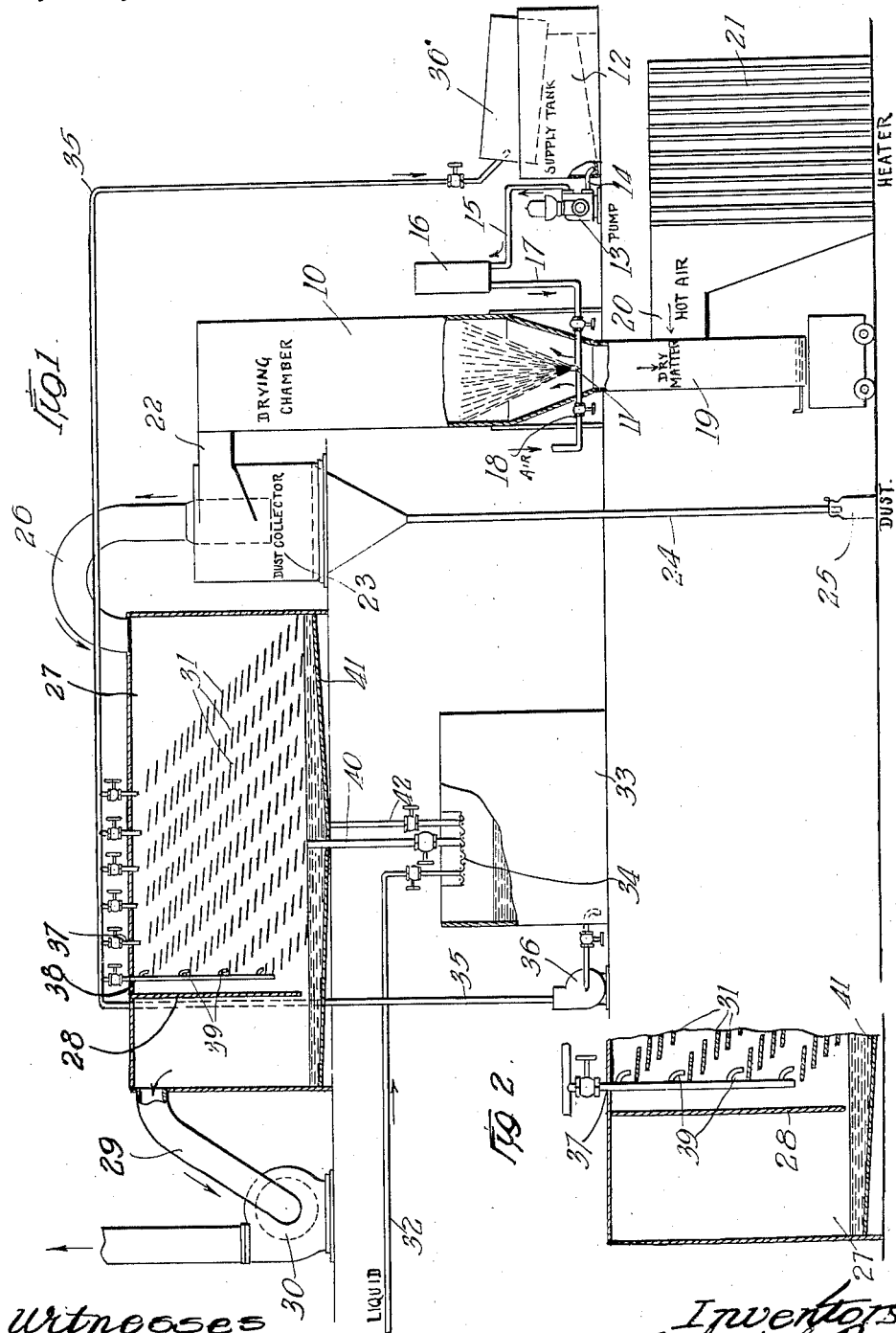

RICHARD G. BRINDLE AND AMOS H. FLINT, OF CHICAGO, ILLINOIS, ASSIGNORS TO CORN PRODUCTS REFINING COMPANY, A CORPORATION OF NEW JERSEY.

APPARATUS FOR RECOVERING HEAT AND SOLID PARTICLES IN SUSPENSION FROM A DRYING-GAS.

1,366,712.     Specification of Letters Patent.     Patented Jan. 25, 1921.

Application filed July 3, 1918. Serial No. 243,249.

*To all whom it may concern:*

Be it known that we, RICHARD G. BRINDLE and AMOS H. FLINT, citizens of the United States, residing at Chicago, in the county of Cook and State of Illinois, have invented certain new and useful Improvements in Apparatus for Recovering Heat and Solid Particles in Suspension from a Drying-Gas, of which the following is a specification.

Our invention relates to the evaporation, to dryness, of liquid or semi-liquid substances, and more especially solutions, and the primary object of the invention is to provide a novel and improved apparatus for recovering the dry products or such portion of the same as may remain in suspension in the air after the drying operation; to save and reuse, so far as possible, the heat employed in the drying operation; and to bring about a preliminary concentration of the liquid substance before it is subjected to the evaporation step, so as to facilitate this operation.

We have shown and will describe the apparatus of our invention as employed in connection with an apparatus for evaporating liquids by the spray desiccation method but it will be obvious that the combination of instrumentalities constituting our invention might be employed in connection with any other drying operation in which heat is employed and in which the product, or a portion of the same, remains in suspension in the air.

The invention is illustrated, in a preferred embodiment, in the accompanying drawing wherein—

Figure 1 is a somewhat diagrammatic view, in elevation, with parts in section, of the apparatus, and Fig. 2 is a detail sectional view, on a somewhat larger scale, showing particularly the construction of the device for bringing the incoming liquid to be treated in contact with the air current from the evaporating operation.

Referring to the drawing, 10 indicates a drying chamber in the bottom of which is arranged a spray nozzle 11 supplied with liquor from supply tank 12 by means of a pump 13 and through pipes 14 and 15, a pressure chamber 16 and pipe 17, compressed air being supplied to the chamber through a pipe 18. The chamber terminates in a chute 19 for the discharge of the bulk of dried material. The drying gas for producing the evaporation, is preferably heated air supplied to the heating chamber through a duct 20, the air being heated by passing over heated coils 21, or in any other suitable manner.

The arrangements above described have reference to the drying of the material and form no part of our present invention.

A duct 22 extends from the upper end of the drying chamber 10 to a dust collector 23 which may be of any suitable type. We have shown a common form of cyclone collector having a discharge pipe 24, to the lower end of which is secured a sack 25 intended to receive the dry material. The air from the dust collector passes through a pipe 26 to a concentrating and heat saving chamber 27. This chamber is provided, near the end opposite to that to which pipe 26 leads, with a partition 28 which extends across the chamber from side to side and from the top of the chamber down to a point not far from the bottom. From the end of the chamber 27, beyond partition 28, leads an air discharge pipe 29 in which is arranged a suction fan 30. Arranged in the body of the chamber are a plurality of inclined shelves 31 which are arranged in diagonal rows extending from near the top of the chamber to points not far from the bottom thereof. The liquid substance to be treated is supplied to the apparatus through a pipe 32 which discharges into a vessel 33 preferably through a screen 34. A pipe 35, in which is arranged pump 36, conducts the liquid from tank 33 to the supply tank 12 above referred to, the liquid preferably being passed through a reel 36' before it enters supply tank 12 so as to remove any particles large enough to clog the spray nozzle. A portion of the liquid passing through pipe 35 is conducted into the chamber 27 and discharged through pipes 37 and pipe 38, the latter being provided with nozzles 39, upon the upper shelves of the several series or rows of shelves above referred to. The liquid flows over these shelves in succession and absorbs a considerable portion of the heat in the air entering chamber 37 from dust collector 23. The air inflowing through the chamber is compelled to make its way across the streams of liquid flowing over the shelves 31 and to pass around the lower edge of the partition 28. As a result any solid particles in suspension in the air which have escaped the action of the cyclone dust collector are intercepted by the liquid which is given a thicker consistency by these accretions. The liquid collects in the bottom of the chamber 27 until it reaches the level of the top of an overflow pipe 40 which leads into tank 33, preferably through the screen 34. The bottom of the chamber is preferably inclined toward a middle point, as indicated at 41, and a valved drain pipe 42 leads from the low point into tank 33. The drain pipe valve is ordinarily closed and this pipe is used only for cleaning out the chamber.

The operation of the apparatus above described is continuous, taking place simultaneously with the evaporation occurring in the spray chamber 10. There is a continuous outflow of the liquor from tank 33 and continuous inflow to the tank from pipes 32 and from the chamber 27 through pipe 40. A part of the liquid pumped from tank 33 is returned to the chamber 27 where it receives accretions of solid matter from the drying chamber, so that a concentration of the liquid delivered to the spray chamber takes place which is automatic and uniform.

We claim:

1. In apparatus for evaporating to dryness a liquid substance by means of a heated drying gas, a vessel into which the liquid to be treated is run, a chamber having a pipe extending through and above the bottom of the chamber for outflow of liquid therefrom to said vessel, an inlet duct for admitting gas, and particles in suspension, from the evaporating apparatus to one end of the chamber, a partition across the other end of the chamber but spaced from the bottom thereof, an outlet duct leading from the end of the chamber beyond the partition, a pipe for conducting liquid from said vessel to the place of evaporation having a branch which conducts some of the liquid to said chamber, and means within the chamber between said partition and the end of the chamber to which the inlet duct leads for disposing the liquid so that the gas, with particles in suspension, from the drying operation will come into contact therewith.

2. In apparatus for evaporating to dryness a liquid substance by means of a heated drying gas, a vessel into which the liquid to be treated is run, a chamber having a pipe extending through and above the bottom of the chamber for outflow of liquid therefrom to said vessel, an inlet duct for admitting gas and particles in suspension from the evaporating apparatus to one end of the chamber, a partition across the other end of the chamber but spaced from the bottom thereof, an outlet duct leading from the end of the chamber beyond the partition, a pipe for conducting liquid from said vessel to the place of evaporation having a branch which conducts some of the liquid to said chamber, and a plurality of inclined shelves in the chamber between said partition and the end of the chamber to which the inlet duct leads over which the liquid received in the chamber flows.

RICHARD G. BRINDLE.
AMOS H. FLINT.